J. J. Adgate,
Horse Power.
N° 77,236. Patented Apr. 28, 1868.
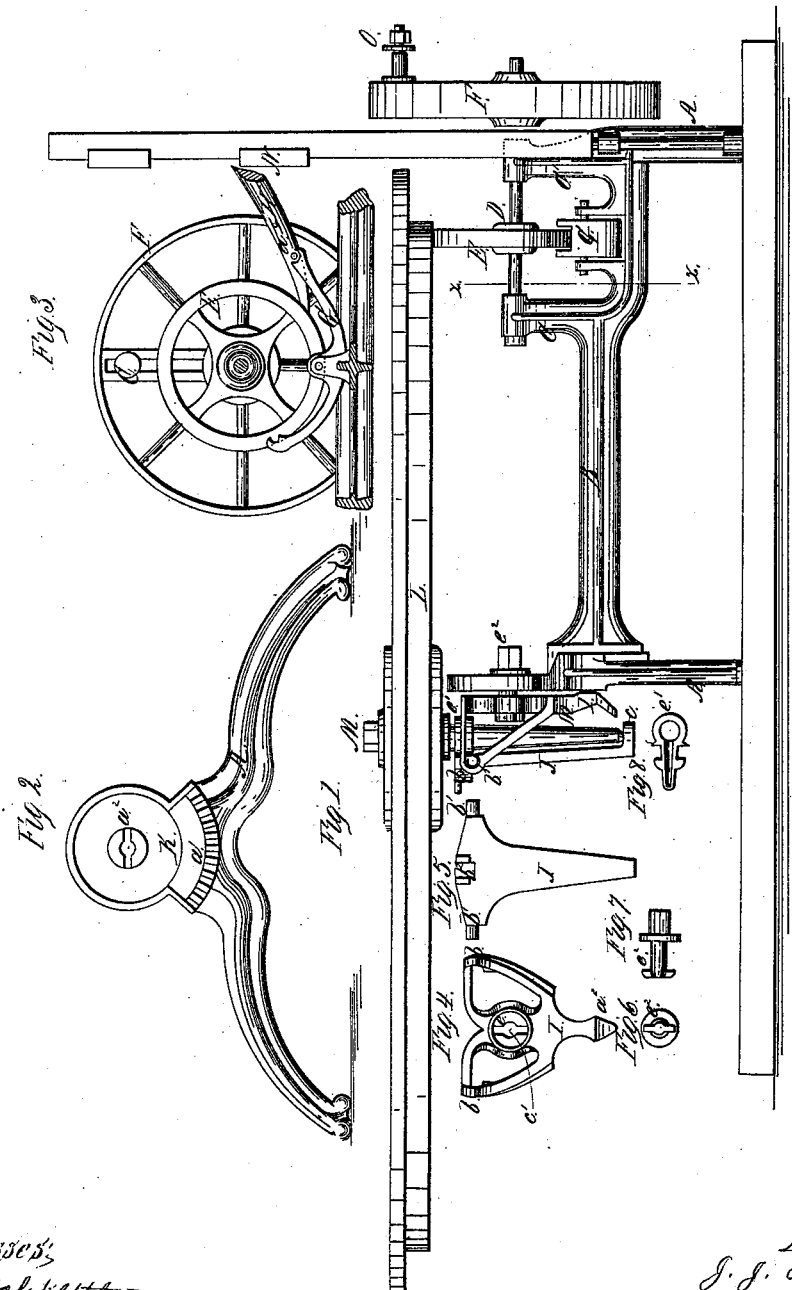
Witnesses:
Inventor:
J. J. Adgate
per Munn & Co.
Attorneys

United States Patent Office.

JOSEPH J. ADGATE, OF LIBERTY, NEW YORK.

Letters Patent No. 77,236, dated April 28, 1868.

IMPROVEMENT IN ANIMAL-POWER.

*The Schedule referred to in these Letters Patent and making part of the same.*

---

TO ALL WHOM IT MAY CONCERN:

Be it known that I, JOSEPH J. ADGATE, of Liberty, in the county of Sullivan, and State of New York, have invented a new and useful Improvement in Animal-Power; and I do hereby declare that the following is a full, clear, and exact description thereof, which will enable others skilled in the art to make and use the same, reference being had to the accompanying drawings, forming part of this specification.

This invention relates to a new and useful improvement in machinery for utilizing the power of horses and other animals, whereby the same is more simple in construction, and more effective in operation. It consists in the construction, arrangement, and combination of the parts, as hereinafter more fully described.

In the accompanying plate of drawings—

Figure 1 is a side view of my invention.

Figure 2 is the outside view of one of the end-pieces of the frame of the machine.

Figure 3 represents a vertical cross-section of my invention, taken in the line $x\ x$, fig. 1.

Figure 4 is a detail front view of a portion of the supporting-attachment of the platform-wheel.

Figure 5 is a detail view of the vibrating supporting-arm.

Figure 6 is an end view of the nut, by means of which the supporting-attachment and vibrating supporting-arm are held upon the frame.

Figure 7 is a side view of the same.

Figure 8 is a plan view of the movable bearing in which the platform-wheel rotates.

Similar letters of reference indicate corresponding parts.

The frame of the machine is made of cast iron, and is composed of the two end-pieces A and A' and the perch B.

The end-pieces A and A' are somewhat of the form as shown in the drawing, branching out, so as to form suitable feet for the support of the machine, and are connected together by a mortise on the inside of each of said end-pieces A A', and a dove-tail wedge-shaped tenon on each end of the perch B; said mortises and said tenons being cast in and upon said end-pieces A and A', and said perch B thus affording a strong and reliable means of securing said perch B between said end-pieces A and A', at the same time that said perch B may easily at any time be removed, when required.

The perch B is furnished with two uprights, C and C', as shown in the drawing, fig. 1; each of said uprights C C' being provided on the top with suitable bearings, in which the shaft D rotates. The shaft D is made of iron, and has keyed upon the same, between the uprights C, a metallic wheel, E. The wheel E has a flat rim, upon which rests the platform-wheel E, as shown.

The shaft D extends beyond the upright, C', and has keyed upon the right-hand end of the same a balance-wheel, F, as shown.

Supported on two shorter uprights, between the uprights C, and rocking in suitable bearings in said uprights, under the wheel E, is a double-curved brake, G, made of cast iron, in the form shown in the drawing. Said brake G is an important feature in my invention, and, being a lever of equal arms, is so arranged that, by pressing down upon either arm of the same, the other arm of said lever will bear upon the rim of the wheel E.

In the end of each of the arms of the said lever are notches, to receive the pivot $a$ of the wooden lever H.

The lever H, turning upon the pivot $a$ in the notches in either end of the brake G, serves, when the longer arm of the same is forced down, to stop the wheel E, by the shorter arm of the same being pressed against the rim of the said wheel E, while the opposite arm of the brake G is pressed, by the downward movement of the brake-lever H, against the rim of the wheel E, on the other side of the same, as shown in fig. 2, thus forming a double brake, or a brake on both sides of the wheel E, operated by placing the lever H on either side of the wheel E.

The platform-wheel M is of the same material and of the same general form as the platform-wheels of like powers now commonly in use, and is provided, through the centre of the same, with a hub and spindle, M, as shown.

Said spindle M is rigidly secured in said wheel L, so as to project downward, as shown, and when in position, as shown in fig. 1, the wheel L rests, near the circumference of said wheel L, upon the rim of the wheel E.

The manner of supporting the centre of the wheel L, so that the wheel L may be held at any convenient angle, in a plane inclined to a horizontal plane, is another important feature of the present invention, and is accomplished by an armed supporting-attachment, I, somewhat in the form as shown in the drawing, fig. 4.

Rocking or vibrating in suitable open bearings, $b$, in the arms of the attachment I, is a movable vibrating supporting-arm, J, provided with journals $b^1$, by means of which the arm J is supported in the journals $b$ of the attachment I, as shown at fig. 1. The journals $b^1$ are each furnished with a nick, on the same side and in the same straight line in each, which, when in a certain position with respect to the edge of the open bearings $b$, will permit the journals $b^1$ to enter said bearings $b$, so that, by turning the arm J, the journals $b$ will turn entirely into said bearings $b$. The openings of the bearings $b$ are of less width than the diameter of the journals $b^1$, and consequently will not permit the passage of said journals $b^1$ in or out of said bearings, except in a certain position of the nick in the same with reference to the edge of the opening of the bearings $b$.

The supporting-arm J is of the general form, as shown at figs. 1 and 5, varying in length according to the size and purpose of the whole machine, and is furnished at the lower end with a projection, $c$; said projection $c$ being drilled or countersunk upon the upper side to receive the end of the spindle M, as shown.

Upon the end-piece A, at the junction of the two feet of the same, is a circular vertical projection, K, which, for convenience, may be part of said end-piece A. The projection K is drilled through the centre, as shown, to receive the bolt $e^2$.

The projection K is chambered out, on the outside face of the same, so as to form a hub-like projection around the centre hole, as shown. Said hub-like projection is furnished with a horizontal slot, $a^2$, to receive the key of the bolt $e^2$. Upon the outside of the end-piece A, under the projection K, in an arc of a circle whose centre is the centre of the circular projection K, are notches or teeth $a^1$, as shown.

Through the attachment I is drilled a hole, $c'$, as shown at fig. 4. Said hole $c'$ is of like diameter with the hole in the centre of the projection K, and through said hole $c'$, on each side of the same, is a slot, $e$, of like size and for like purpose as the slot $a^2$.

Upon the inside face of the attachment I is a short arc of a circle, whose diameter is the same as the diameter of the circle of the arc $a^1$, and whose centre is the centre of the hole $c'$ where are the teeth $a^3$.

Another important feature of my invention consists in the manner of holding the attachment I against the projection K, which is accomplished in the following manner: Upon the outside of the attachment I, on each side of the slot $e$, said attachment is provided with inclined faces, the inclination of the face on one side of the slot $e$ being opposite to the inclination of the face on the other side of said slot $e$. The bolt $e^2$, by means of which the attachment J is held upon the end-piece A, is a metallic bolt, provided with a square head upon one end, to receive a wrench, and with a cross-key rigidly secured to the other end of the same, as shown at fig. 7. The length of the bolt $e^2$, between the key and the shoulder of the same, is exactly equal to the thickness of the attachment I on each side of the slot $e$, and the thickness of the circular projection K around the centre of the same. Having first placed the supporting-arm J in position in the bearings $b$ of the attachment I, then place the attachment I against the outside of the projection K, so that the hole $c'$ will correspond with the hole in the centre of said projection K. The slot $e$ being in a horizontal position, insert the bolt $e^2$ from the inside of the circular projection, through said projection K, and through the attachment I, and having placed the attachment I in such position as to give the platform-wheel L the necessary inclination. Said attachment I, having a rotating motion on the bolt $e^2$ for that purpose by turning the bolt $e^2$, the attachment I will be firmly held against the circular projection K, and will be prevented from turning by the notches or teeth $a^3$ in said attachment I engaging with the notches or teeth $a^1$ on the end-piece A.

Supported by suitable projections on the end-piece A' is a fence or other upright, N, to which the animal is hitched when walking upon the inclined-platform wheel L, and to prevent injury to the animal from the balance-wheel F.

In a radial slot in the fly-wheel F is a crank-pin, O. The crank-pin O consists of a bolt flatted next to the head to fit the slot in the fly-wheel F, and to move freely in the same. Upon said bolt on the outside of the wheel F are two washers, between which any connecting-rod may be placed, and upon the outer end of said bolt are a screw-thread and nut, by means of which the crank-pin O is firmly held in any position in the slot in the wheel F, and any connecting-rod is also held upon the crank-pin O, by means of which said crank-pin O is quickly adjusted in the slot in the wheel F, to give any required length of stroke to a connecting-rod and its attachments.

Upon the arm J, and fitting in a notch, $b^2$, in the same, is a movable metallic bearing, $e^2$, of the form as shown at fig. 8. The bearing $e^1$ is furnished with a hole to receive the spindle M, and a groove or channel, as shown, to receive oil or other lubricating-fluid, and direct the same to the spindle M. The platform-wheel L is placed with an edge upon the wheel E, with the spindle M through the bearing $e^1$ and upon the arm $c$, as shown in the drawing, fig. 1.

The operation is like that of other similar powers now commonly in use, motion being given to the platform-wheel L by the walking of the animal upon the same, said motion being communicated by friction to the wheel E and to the shaft D, and constructed, as above described, of proper size and strength, is adapted to horses, dogs, or other animals.

The advantages over other similar machines are the ease and facility with which the inclination of the platform-wheel may be adjusted, the peculiar efficiency of the brake, the ease with which the machine may be taken apart, when necessary, the convenient method, owing to the peculiar construction of the crank-pin O, of adjusting the length of the stroke to the apparatus or purpose required.

I claim as new, and desire to secure by Letters Patent—

1. A machine for utilizing and economizing animal-power, composed of a platform-wheel, L, rotating in bearings in a vibrating-arm, J, adjustable at any required angle by the supporting-attachment I, held upon the circular projection K, substantially as shown and described.

2. The rotating supporting-attachment I, furnished with notches or teeth $a^3$, in combination with the circular projection K, and the notches $a^1$ on the end-piece A, substantially as shown and described.

3. The device for tightening the supporting-attachment I upon the circular projection K, by means of the bolt $e^2$ and the opposite inclined faces on the attachment I, substantially as shown and described.

4. The vibrating-arm J, formed with a projection, $c$, in combination with the movable bearing $e^1$ and the spindle M, substantially as shown and described, and for the purposes set forth.

5. The slots $e$ and $a^3$, in combination with the bolt $e^2$, substantially as shown and described, and for the purposes set forth.

6. The manner of joining the end-pieces A and A' with the perch B by mortises or slots, and wedge-shaped and dove-tail tenons, substantially as shown and described, and for the purposes set forth.

7. The double-acting friction-brake G, in combination with the wheel E, substantially as shown and described, and for the purposes set forth.

8. The crank-pin O, arranged to be adjusted in a radial slot in a wheel, F, and secured in place by means of nut and washers, operating substantially as and for the purpose set forth.

The above specification of my invention signed by me, this 21st day of December, 1867.

JOSEPH J. ADGATE.

Witnesses:
WM. F. MCNAMARA,
ALEX. F. ROBERTS.